(12) United States Patent  
Park et al.

(10) Patent No.: US 9,313,571 B2  
(45) Date of Patent: Apr. 12, 2016

(54) ELECTRONIC APPARATUS AND A METHOD OF CONTROLLING THE SAME

(71) Applicant: SAMSUNG Electronics Co., Ltd., Suwon-si, Gyeonggi-do (KR)

(72) Inventors: Hyun-jun Park, Seoul (KR); Ki-young Ko, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 61 days.

(21) Appl. No.: 14/188,962

(22) Filed: Feb. 25, 2014

(65) Prior Publication Data

US 2014/0334636 A1  Nov. 13, 2014

(30) Foreign Application Priority Data

May 8, 2013 (KR) ........................ 10-2013-0052094

(51) Int. Cl.
*H04R 3/00* (2006.01)
*G06F 3/16* (2006.01)
*H04M 1/725* (2006.01)

(52) U.S. Cl.
CPC *H04R 3/00* (2013.01); *G06F 3/165* (2013.01); *H04M 1/7253* (2013.01); *H04M 1/72558* (2013.01); *H04M 2250/02* (2013.01)

(58) Field of Classification Search
None
See application file for complete search history.

(56) References Cited

U.S. PATENT DOCUMENTS

| 6,711,631 | B1 * | 3/2004 | Chan et al. ...................... 710/14 |
| 8,411,870 | B2 * | 4/2013 | Shimoharada .................. 381/55 |
| 8,675,893 | B2 * | 3/2014 | Wada ............................. 381/104 |
| 2005/0086614 | A1 * | 4/2005 | Cheng et al. .................. 715/864 |
| 2006/0080475 | A1 * | 4/2006 | Lam et al. ....................... 710/14 |
| 2007/0282471 | A1 | 12/2007 | Lee et al. |
| 2010/0062805 | A1 * | 3/2010 | Moran et al. ............... 455/556.1 |
| 2011/0129103 | A1 * | 6/2011 | Hara et al. .................... 381/120 |
| 2011/0129104 | A1 * | 6/2011 | Saito ............................. 381/120 |
| 2011/0158436 | A1 * | 6/2011 | Imamura ....................... 381/120 |
| 2011/0261978 | A1 * | 10/2011 | Yamaguchi ................... 381/120 |

FOREIGN PATENT DOCUMENTS

EP 1583249 A1 10/2005

OTHER PUBLICATIONS

Extended European Search Report dated Dec. 8, 2015 in corresponding European Patent Application No. 14153178.0.

* cited by examiner

*Primary Examiner* — Paul Huber
(74) *Attorney, Agent, or Firm* — Staas & Halsey LLP

(57) ABSTRACT

An electronic apparatus includes a storage to store an operating system, a controller to boot the electronic apparatus using the operating system stored in the storage, a speaker to output sound, a communication interface to receive sound data from an external apparatus, and a sound processor to process and output the received sound data through the speaker, and the communication interface, the sound processor, and the speaker operate even when the electronic apparatus is not booted.

19 Claims, 6 Drawing Sheets

ELECTRONIC APPARATUS AND A METHOD OF CONTROLLING THE SAME

CROSS-REFERENCE TO RELATED APPLICATIONS

This application claims priority under 35 U.S.C. §119 from Korean Patent Application No. 10-2013-0052094, filed on May 8, 2013 in the Korean Intellectual Property Office, the disclosure of which is incorporated herein by reference in its entirety.

BACKGROUND OF THE INVENTION

1. Field of the Invention

The present general inventive concept generally relates to an electronic apparatus, and more particularly, to an electronic apparatus capable of outputting sound transmitted thereto using a Bluetooth method even when the electronic apparatus is not booted.

2. Description of the Related Art

A notebook computer refers to a notebook-sized portable computer which may be conveniently carried and used on the move. Recently, a slate personal computer (PC) and a tablet PC, etc., on which a touch screen is mounted and a keyboard is removed to enhance mobility, have been widely used.

Conventional notebook computers have a high-performance speaker and are capable of performing Bluetooth communication, and thus a user is able to transmit sound data stored in an external apparatus to a notebook computer using a Bluetooth method to listen to the sound data.

However, in conventional notebook computers, the Bluetooth communication is available only when the notebook computer is booted, and thus there is a problem that the user should boot the notebook computer in order to play the sound data stored in the external apparatus using a speaker which is embedded in the notebook computer.

SUMMARY OF THE INVENTION

The present general inventive concept provides an electronic apparatus capable of outputting sound corresponding to sound data transmitted to the electronic apparatus using a Bluetooth method even when the electronic apparatus is not booted. That is, when the electronic apparatus is in a power-off state, the electronic apparatus may both receive sound data from an external apparatus and output the sound data as sound.

Additional features and utilities of the present general inventive concept will be set forth in part in the description which follows and, in part, will be obvious from the description, or may be learned by practice of the general inventive concept.

The foregoing and/or other features and utilities of the present general invention concept may be achieved by providing an electronic apparatus including a storage to store an operating system, a controller to boot the electronic apparatus using the operating system stored in the storage, a speaker to output sound, a communication interface to receive sound data from an external apparatus, and a sound processor to process and output the received sound data through the speaker. In addition, the communication interface, the sound processor, and the speaker operate even when the electronic apparatus is not booted.

Herein, the communication interface may include a Bluetooth communicator configured to receive sound data using a Bluetooth method, and when the electronic apparatus is booted, the Bluetooth communicator may transmit the received sound data to the sound processor using a digital method, and when the electronic apparatus is not booted, may transmit the received sound data to the sound processor using an analog method.

At this time, when the electronic apparatus is booted, the Bluetooth communicator may transmit the received sound data to the sound processor using the digital method by control of the controller, and when the electronic apparatus is not booted, may transmit the received sound data to the sound processor using the analog method without control of the controller.

The sound processor may include an audio amplifier configured to amplify the sound data transmitted using the analog method and output the sound data through the speaker.

At this time, the audio amplifier may operate only when the electronic apparatus is not booted.

The sound processor may further include an audio codec configured to decode the sound data transmitted using the digital method and output the sound data through the speaker, and a Platform Controller Hub (PCH) configured to transmit the sound data outputted from the Bluetooth communicator to the audio codec.

At this time, the audio codec may operate by control of the controller when the electronic apparatus is booted.

When the electronic apparatus is booted while the received sound data is transmitted to the sound processor using the analog method, the Bluetooth communicator may transmit the received sound data to the sound processor using the digital method.

The electronic apparatus may further include a power supply configured to supply power to each component of the electronic apparatus. In addition, even when a booting instruction to the electronic apparatus is not inputted, the power supply may supply power to the Bluetooth communicator and the audio amplifier, and may supply no power to the controller and the storage.

The communication interface may include a first Bluetooth communicator configured to operate only when the electronic apparatus is booted, and exchange data with an external apparatus using the Bluetooth method and a second Bluetooth communicator configured to receive sound data from an external apparatus using the Bluetooth method and transmit the received sound data to the sound processor using the analog method.

At this time, when sound data is received using the Bluetooth method, the first Bluetooth communicator may transmit the received sound data to the sound processor using the digital method.

The first Bluetooth communicator may operate by control of the controller, and the second Bluetooth communicator may operate by control of the controller or operates even without control of the controller.

The sound processor may include an audio amplifier configured to amplify the sound data transmitted through the second Bluetooth communicator and output the sound data through the speaker, an audio codec configured to operate when the electronic apparatus is booted, decode the sound data transmitted using the digital method, and output the sound data through the speaker, and a PCH configured to transmit the sound data outputted from the first Bluetooth communicator to the audio codec.

The audio processor may further include a switch configured to selectively transmit the sound data outputted from the audio amplifier or the audio codec to the speaker.

The storage may store sound source data, and when the second Bluetooth communicator receives sound data from a first external apparatus, the controller may control the second Bluetooth communicator to transmit the sound source data to a second external apparatus.

Meanwhile, the electronic apparatus may further include a power supply configured to supply power to each component of the electronic apparatus. In addition, when the booting instruction to the electronic apparatus is not inputted, the power supply may supply power to the second Bluetooth communicator and the audio amplifier, and may supply no power to the controller, the storage, the first Bluetooth communicator, the audio codec, and the PCH.

The electronic apparatus may be an all-in-one PC or a notebook computer.

The foregoing and/or other features and utilities of the present general inventive concept may also be achieved by providing an electronic apparatus including a speaker to output sound data as sound, and a communication interface to be in a state to, when the electronic apparatus is in a power-off state, receive sound data from an external apparatus and transmit the received sound data to a sound processor which processes the sound data such that the speaker outputs the processed sound data as sound when the electronic apparatus is in the power-off state.

The foregoing and/or other features and utilities of the present general inventive concept may also be achieved by providing a method of controlling an electronic apparatus, the method including receiving sound data from an external apparatus, and outputting the sound data as sound from a speaker of the electronic apparatus such that the receiving and outputting are performed when the electronic apparatus is in a power-off state.

The foregoing and/or other features and utilities of the present general inventive concept may also be achieved by providing a non-transitory computer-readable medium to contain computer-readable codes as a program to perform a method of controlling an electronic apparatus, the method including receiving sound data from an external apparatus, and outputting the sound data as sound from a speaker of the electronic apparatus such that the receiving and outputting are performed when the electronic apparatus is in a power-off state.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
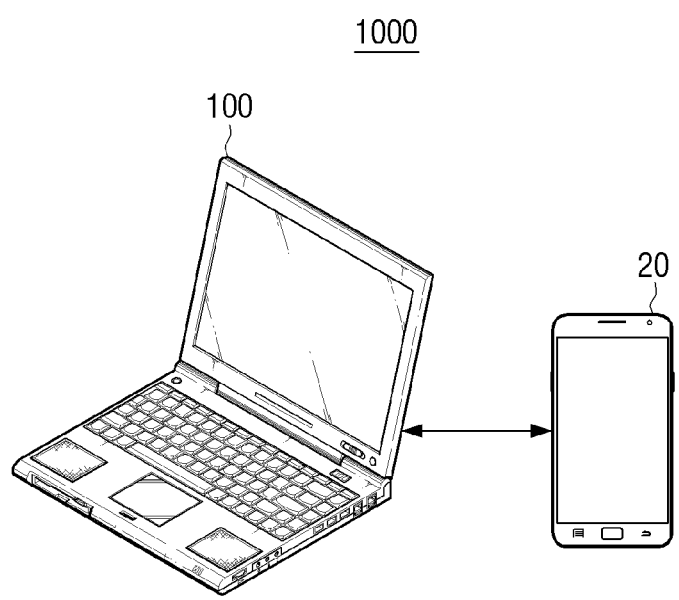
FIG. 1 is a view illustrating an electronic system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a view illustrating an electronic system according to an exemplary embodiment of the present general inventive concept.

Referring to FIG. 1, an electronic system 1000 according to the present general inventive concept is composed of an electronic apparatus 100 and an external apparatus 20.

The electronic apparatus 100 receives an operation instruction from a user, and executes an operation in response to the received operation instruction. In addition, the electronic apparatus 100 may receive sound data from the external apparatus 20 using the Bluetooth method, and may output the received sound data using an embedded speaker. The electronic apparatus 100 may be a PC, a notebook computer, a Portable Multimedia Player (PMP), a cradle of an electronic device, or the like, which operates after booting an operating system. Herein, a PC may be an all-in-one PC, and a cradle may be a configuration which is capable of extending functions of a notebook computer, a PMP, or any electronic device, by being connected thereto. For example, the cradle may be a docking station of a PMP which charges a battery of the PMP while also performing functions of the PMP (i.e., playing sound data). Operations and configurations of the electronic apparatus 100 will be described below in detail with reference to FIG. 2.

The external apparatus 20 stores sound source data and transmits sound data corresponding to the stored sound source data to the electronic apparatus 100 using the Bluetooth method. The external apparatus 20 may be any one of a PC, a notebook computer, a mobile phone, a smart phone, a PMP, an MP3 player, and the like, so long as it supports Bluetooth communication.

Figure 2:
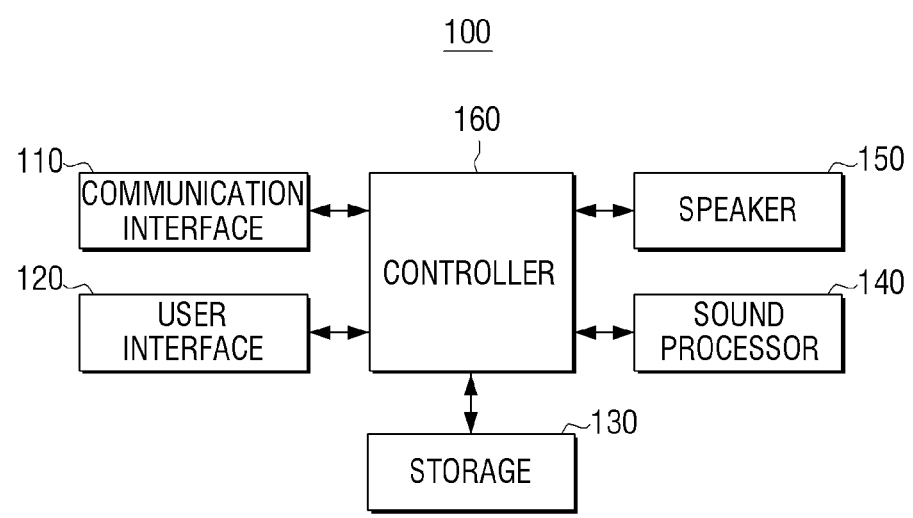
FIG. 2 is a block diagram illustrating a configuration of the electronic apparatus in FIG. 1.

FIG. 2 is a block diagram illustrating a configuration of the electronic apparatus in FIG. 1.

Referring to FIG. 2, the electronic apparatus 100 of the present general inventive concept may include a communication interface 110, a user interface 120, a storage 130, a sound processor 140, a speaker 150, and a controller 160.

The electronic apparatus 100 includes a plurality of operation modes. According to an operation state of the electronic apparatus 100, the plurality of operation modes may be classified into a normal mode in which the electronic apparatus 100 executes a normal operation using the operating system and a non-booting mode in which the operating system is not loaded on the electronic apparatus 100.

Herein, the normal mode refers to a mode in which the operating system stored in a non-volatile memory is loaded on a volatile memory so that an operation of the electronic apparatus 100 is controlled, and the non-booting mode refers to a mode in which an operation of the electronic apparatus 100 is not controlled by the operating system, for example, a power-off mode, a power saving mode, any other mode than the normal mode, etc.

The communication interface 110 may be formed to connect the electronic apparatus 100 to an external apparatus, for example external apparatus 20, and may be connected to the external apparatus 20 using not only a Local Area Network (LAN) and an internet network, but also a wireless communication method (e.g., a wireless communication method such as GSM, UMTS, LTE, Bluetooth, WiBRO, etc.).

In addition, the communication interface 110 may receive sound data from an external apparatus 20. To be specific, the communication interface 110 may include a Bluetooth communicator, and may receive sound data from the external apparatus 20 using the Bluetooth communicator. Further, the communication interface 110 via the Bluetooth communicator may transmit the sound data received from a first external apparatus to a second external apparatus. In the implementation, the communication interface 110 may be realized as a single Bluetooth communicator, or may be realized as a plurality of Bluetooth communicators. A case of realizing the communication interface 110 using a single Bluetooth communicator will be described below with reference to FIG. 3, and a case of realizing the communication interface 110 using a plurality of Bluetooth communicators will be described below with reference to FIG. 4. The present general inventive concept describes data which an apparatus stores as sound source data, and describes data which is exchanged with an external apparatus as sound data for convenience in explanation. However, it should be noted that the sound data and the sound source data may be the same.

The communication interface 110 may transmit/receive sound data to/from an external apparatus 20. In addition, the communication interface 110 may transmit and receive different sound data. For example, when the communication interface 110 includes a plurality of Bluetooth communicators, the communication interface 110 may receive sound data transmitted from a first external apparatus 20 using a first Bluetooth communicator, and may transmit sound source data stored in the storage 130, which will be described below, to at least one second external apparatus using a second Bluetooth communicator.

The user interface 120 may input various commands to perform various functions supported by the electronic apparatus 100, and may display various information provided by the electronic apparatus 100. In the implementation, the user interface 120 may be realized as a touch screen where an input function and an output function operate in a single apparatus, as a combination of an input device such as a mouse and a keyboard and an output device such a LCD (Liquid Crystal Display) monitor, or any electronic device or combination of electronic devices capable of interacting with a user to receive an input function and output an output function.

The user interface 120 may receive a selection of sound source data stored in the storage 130 which will be described below. In addition, the user interface 120 may display a list of external apparatuses which are connectable using the Bluetooth method, and may input a selection of one of the external apparatuses as an external apparatus to be connected.

The storage 130 may store a program to operate the electronic apparatus 100. To be specific, the storage 130 may store a program that is a set of various instructions required to operate the electronic apparatus 100. Herein, the program includes not only an application to provide a certain service but also an operating system to operate the application.

The storage 130 may store sound source data. Herein, the sound source data may be sound source data such as a MP3 file, a way file, or the like, and may be streaming data.

The storage 130 may be realized as a storage media within the electronic apparatus 100, an external storage media, (e.g., a removable disk including a Universal Serial Bus (USB) memory, a web server based on a network, or the like).

The sound processor 140 may process and output received sound data through the speaker 150. To be specific, the sound processor 140 may output sound data received from the communication interface 110 through the speaker 150. The configuration and operation of the sound processor 140 will be described below in detail with reference to FIG. 3 and FIG. 4.

The speaker 150 may output sound data provided from the sound processor. The present general inventive concept describes that the provided sound data is outputted only through the speaker 150, but the present general inventive concept is not limited thereto. For example, the sound data may be outputted through an ear-phone and a speaker which are separable from, and connectable to, the electronic apparatus 100 using a sound output terminal or using a wireless connection (e.g., Bluetooth) in the implementation.

The controller 160 may control each component within the electronic apparatus 100. To be specific, when a booting instruction is inputted from a user, the controller 160 may perform booting using the operating system stored in the storage 130. In addition, when sound data is transmitted from an external apparatus, for example external apparatus 20, the controller 160 may control the communication interface 110 and the sound processor 140 so that the sound data transmitted from the external apparatus 20 is outputted through the speaker 150.

Meanwhile, when the controller 160 is not booted, the communication interface 110 and the sound processor 140 autonomously output the sound data transmitted from the external apparatus through the speaker 150. That is, the communication interface 110 and the sound processor 140 may output the sound data, transmitted from the external apparatus, through the speaker 150 without receiving outside control from, for example, the controller 160, when the electronic apparatus 100 is not booted.

As specified above, the electronic apparatus 100 of the present general inventive concept may output sound data transmitted from the external apparatus 20 through the speaker 150 by the autonomous operations of the communication interface 110 and the sound processor 150 even when the electronic apparatus 100 is not booted. Hence, it is possible to decrease a user's inconvenience of connecting to a separate audio device or booting a PC in order to play and listen to a music file stored in the external apparatus 20, such as a smart phone or the like, using the separate audio device or PC, such as a notebook computer, an all-in-one PC, or the like. That is, implementing the present general inventive concept allows a user to transmit a sound file from an external apparatus to a separate audio device or PC to play and listen to the sound file using the audio device or PC without requiring the user to either directly connect the external device to the audio device or PC or boot the audio device or PC. In other words, while the separate audio device or PC is in a power-off state, a user may transmit a sound file from the external apparatus to the audio device or PC to play and listen to the sound file using the audio device or PC.

Meanwhile, in explaining FIG. 1, the electronic apparatus 100 has been shown and described as including the configurations of the controller 160 and the storage 130, but when the electronic apparatus 100 is realized as a cradle, the configurations of the aforementioned controller 160 and the storage 130 may be a configuration of a notebook computer, a PMP, or the like, which is connected to the cradle.

Figure 3:
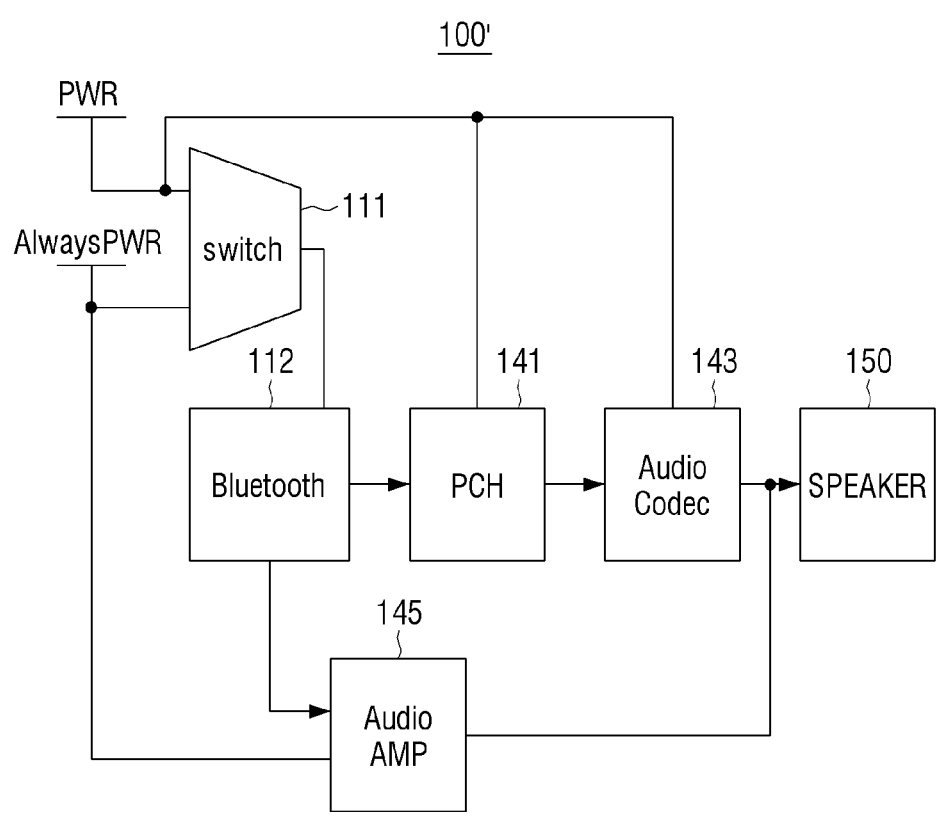
FIG. 3 is a view illustrating configurations of the communication interface and the sound processor according to a first exemplary embodiment of the present general inventive concept.

FIG. 3 is a view illustrating the configurations of the communication interface and the sound processor according to the first exemplary embodiment of the present general inventive concept. To be specific, the first exemplary embodiment of the present general inventive concept is an implementation example of an electronic apparatus using a single Bluetooth module.

When the communication interface 110 and/or the sound processor 140 are included in the controller 160 as a single semiconductor chip, the controller 160 may have a plurality of sections to be selectively supplied with power and signals to perform a function as described above. When the communication interface 110 and/or the sound processor 140 are not included in the controller 160, the communication interface 110 and the sound processor 140 may communicate with each other without interference of the controller 160.

Referring to FIG. 3, an electronic apparatus 100' may include a switch 111, a Bluetooth communicator 112, a Platform Controller Hub (PCH) 141, an audio codec 143, an audio amplifier 145, and a speaker 150.

The switch 111 may supply power to the Bluetooth communicator 112. To be specific, when an operation mode of the electronic apparatus 100' is the non-booting mode, that is, before the electronic apparatus 100' is booted, the switch 111 may supply "AlwaysPWR" to the Bluetooth communicator 112. In addition, when the electronic apparatus 100' is in a booting process, or the operation mode of the electronic apparatus 100' is the normal mode, the switch 111 may supply operating power (PWR) to the Bluetooth communicator 112. Alternatively, the switch 111 may be omitted in the implementation.

Herein, the AlwaysPWR refers to power which is provided to a configuration for receiving a user's control instruction, and the like, even when the electronic apparatus 100' is not booted, and the PWR refers to power which is provided to each component of the electronic apparatus 100' when the electronic apparatus 100' is in a wake-up process or the operation mode of the electronic apparatus 100' is the normal mode. Hereinafter, it is assumed that the wake-up process before the normal mode is the normal mode, for convenience in explanation.

Although FIG. 3 illustrates the switch 111 as a configuration of supplying power to the Bluetooth communicator 112, the switch 111 may be a component of a power supply (not depicted) which provides power to each component within the electronic apparatus 100' in the implementation.

To be specific, in the normal mode, a power supply may supply power to the Bluetooth communicator 112, the PCH 141, and the audio codec 143, and may not supply power to the audio amplifier 145. In addition, in the non-booting mode, a power supply may supply power only to the Bluetooth communicator 112 and the audio amplifier 145, and may not supply power to the aforementioned PCH 141, the audio codec 143, the controller 160, and the storage 130. Meanwhile, it has been described that power is not supplied to the speaker 150 in the non-booting mode, that is, the speaker 150 operates by output of the audio amplifier, but when power is required to operate the speaker 150, a power supply may supply power to the Bluetooth communicator 112, the audio amplifier 145, and the speaker 150 only when the electronic apparatus 100' is in the non-booting mode.

The Bluetooth communicator 112 may be a component of the communication interface 110, and may communicate with at least one external apparatus, for example external apparatus 20, using the Bluetooth method. To be specific, the Bluetooth communicator 112 may receive sound data transmitted using the Bluetooth method from the external apparatus 20.

In addition, the Bluetooth communicator 112 may output the received sound data by varying a processing method to the sound data depending upon an operation mode of the electronic apparatus 100'. To be specific, when the electronic apparatus 100' is booted, that is, when the operation mode of the electronic apparatus 100' is the normal mode, the Bluetooth communicator 112 may transmit the sound data received from the external apparatus 20 to the sound processor (to be specific, the PCH) using the digital method by control of the controller 160. In addition, when the operation mode of the electronic apparatus 100' is the non-booting mode, the Bluetooth communicator 112 may be configured to convert the received sound data using an analog method, and transmit the converted analog sound data to the audio amplifier 145 upon receiving the sound data from the external apparatus 20.

The PCH 141 may be a component of the aforementioned sound processor 140, and may transmit digital sound data outputted from the Bluetooth communicator 112 to the audio codec 143.

The audio codec 143 may be a component of the aforementioned sound processor 140, may receive digital sound data outputted from the Bluetooth communicator 112 through the PCH 141, may decode the received sound data, and may output the decoded sound data through the speaker 150. Technologies regarding an audio codec are common knowledge, and thus the description for the audio codec 143 will be omitted.

The audio amplifier 145 may be a component of the aforementioned sound processor 140, may amplify analog sound data outputted from the Bluetooth communicator 112, and may output the amplified sound data through the speaker 150. The audio amplifier 145 may operate only when the electronic apparatus 100' is not booted, and may not operate when the electronic apparatus 100' is booted.

Hereinafter, an operation of the electronic apparatus 100', when the electronic apparatus 100' includes a single Bluetooth module and the operation mode of the electronic apparatus 100' is the normal mode, will be described.

When the operation mode of the electronic apparatus 100' is the normal mode, the electronic apparatus 100' may be controlled by an operating system. At this time, when a request for connection in the Bluetooth method is received from an external apparatus, for example external apparatus 20, the Bluetooth communicator 112 may notify the controller 160 that a request for Bluetooth connection has been received from the external apparatus 20, and the controller 160 may control the user interface 120 to display the request for the Bluetooth connection.

When the request for the Bluetooth connection is received from the external apparatus 20, the controller 160 may perform authentication of the external apparatus 20 via pre-stored information or a user's selection, and may control the Bluetooth communicator 112 to receive sound data from the authenticated external apparatus 20.

When the Bluetooth communicator 112 receives the sound data from the external apparatus 20, the controller 160 may control the Bluetooth communicator 112, the PCH 141, and the audio codec 143 so that the received sound data is decoded in the audio codec 143. In addition, the controller 160 may control the audio codec 143 and the speaker 150 so that the decoded sound data is outputted through the speaker 150.

Hereinafter, an operation of the electronic apparatus 100', when the electronic apparatus 100' includes a single Bluetooth module and the operation mode of the electronic apparatus 100' is the non-booting mode, will be described.

When the operation mode of the electronic apparatus 100' is the non-booting mode, the power supply does not supply power to the PCH 141, the audio codec 143, and the controller 160, and supplies power to the Bluetooth communicator 112 and the audio amplifier 145.

In this state, the Bluetooth communicator 112 may operate only in a mode of receiving sound data from an external apparatus, for example external apparatus 20.

Accordingly, the Bluetooth communicator 112 is paired with the external apparatus 20 by a request of the external apparatus 20, and receives sound data from the paired external apparatus 20. At this time, the Bluetooth communicator 112 decodes the received sound data and outputs the analog sound data to the audio amplifier 145. The audio amplifier 145 receives the analog sound data and then amplifies and outputs the received analog sound data through the speaker 150.

Figure 4:
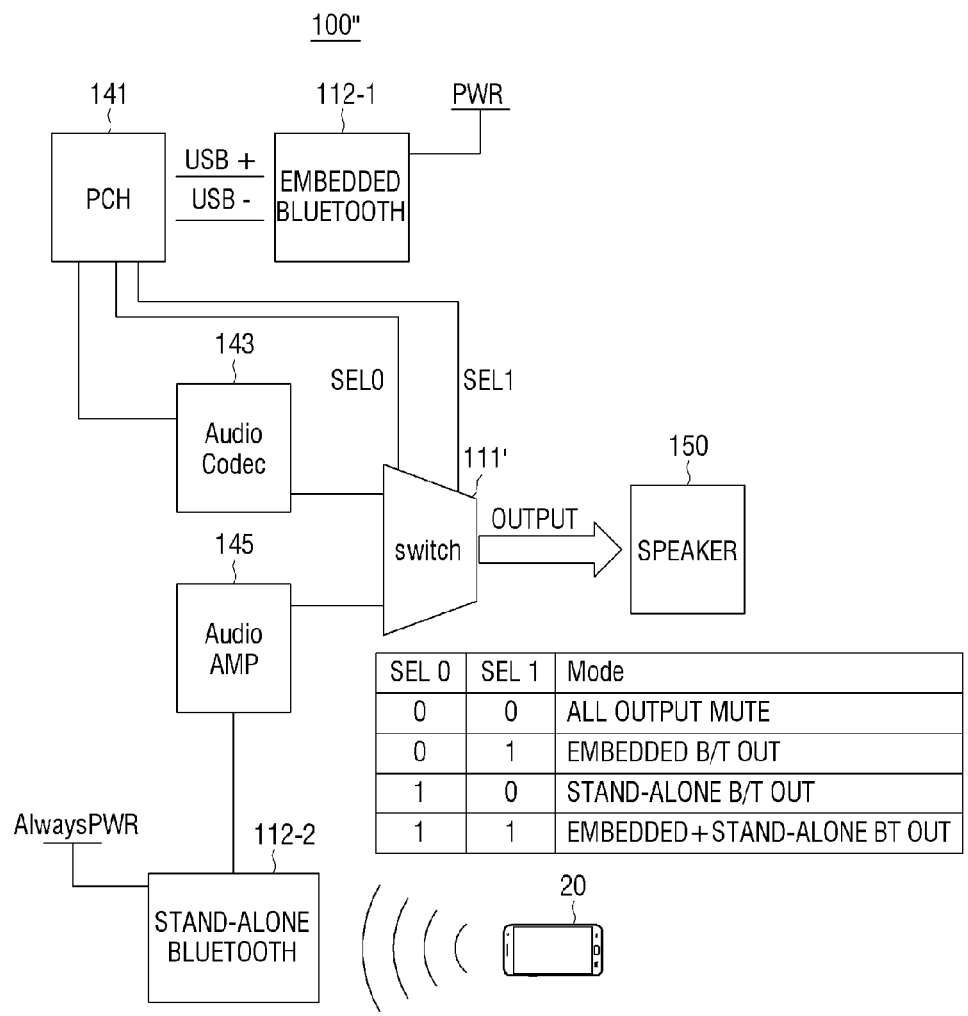
FIG. 4 is a view illustrating the configurations of the communication interface and the sound processor according to a second exemplary embodiment of the present general inventive concept.

FIG. 4 is a view illustrating the configurations of the communication interface 110 and the sound processor 140 according to a second exemplary embodiment of the present general inventive concept. To be specific, the second exemplary embodiment of the present general inventive concept is an implementation example of an electronic apparatus using two Bluetooth modules.

Referring to FIG. 4, an electronic apparatus 100" is composed of a switch 111', a first Bluetooth communicator 112-1, a second Bluetooth communicator 112-2, the PCH 141, the audio codec 143, the audio amplifier 145, and the speaker 150.

The switch 111' may selectively output sound data transmitted from the audio codec 143 or the audio amplifier 145 through the speaker 150. Meanwhile, when the operation mode of the electronic apparatus 100" is the non-booting mode, the switch 111' transmits the sound data transmitted from the audio amplifier 145 to the speaker 150, and when the operation mode of the electronic apparatus 100" is the normal mode, the switch 111' selectively outputs the sound data transmitted from the audio codec 143 or the audio amplifier 145 to the speaker 150 via control of the controller 160.

The first Bluetooth communicator 112-1 may exchange data with an external apparatus, for example external apparatus 20, using a digital method. To be specific, the first Bluetooth communicator 112-1 may operate when the operation mode of the electronic apparatus 100" is the normal mode, and when sound data is received from the external apparatus 20, the first Bluetooth communicator 112-1 may output the received sound data to the PCH 141 using the digital method. Meanwhile, when the operation mode of the electronic apparatus 100" is the non-booting mode, the first Bluetooth communicator 112-1 may not operate since no power is supplied thereto.

The PCH 141 may be a component of the aforementioned sound processor 140, and may transmit the digital sound data outputted from the first Bluetooth communicator 112-1 to the audio codec 143.

The PCH 141 may control an operation of the switch 111'. To be specific, according to a user's control or an operation state of the first Bluetooth communicator 112-1 or the second Bluetooth communicator 112-2, the PCH 141 may control an operation of the switch 111'. For example, when sound data is received through the second Bluetooth communicator 112-2, the PCH 141 may control the switch 111' so that an output signal of the audio amplifier 145 is transmitted to the speaker 150. Meanwhile, when the sound data is received through the first Bluetooth communicator 112-1, the PCH 141 may control the switch 111' so that the output signal of the audio codec 143 is transmitted to the speaker 150.

The audio codec 143 may be a component of the aforementioned sound processor 140, may receive digital sound data outputted from the first Bluetooth communicator 112-1 through the PCH 141, and may decode and output the received sound data through the speaker 150.

The second Bluetooth communicator 112-2 may receive sound data from an external apparatus, for example, external apparatus 20, using the Bluetooth method. In addition, when sound data is received from the external apparatus 20, the second Bluetooth communicator 112-2 may convert the received sound data using an analog method, and may transmit the converted analog sound data to the audio amplifier 145. Herein, the second Bluetooth communicator 112-2 may be a receive-only Bluetooth communication module which is configured to receive data only from an external apparatus, for example external apparatus 20.

The audio amplifier 145 may be a component of the aforementioned sound processor 140, may amplify and output analog sound data outputted from the second Bluetooth communicator 112-2 through the speaker 150.

Hereinafter, an operation of the electronic apparatus 100", when the electronic apparatus 100" includes a plurality of Bluetooth modules and the operation mode of the electronic apparatus 100" is the normal mode, will be described.

When the operation mode of the electronic apparatus 100" is the normal mode, the electronic apparatus 100" is controlled by an operating system. At this time, when a request for connection in the Bluetooth method is received from an external apparatus, for example external apparatus 20, the first Bluetooth communicator 112-1 or the second Bluetooth communicator 112-2 may notify the controller 160 that a request for Bluetooth connection of the external apparatus 20 has been received, and the controller 160 may control the user interface 120 to display the request for the Bluetooth connection.

When the request for the Bluetooth connection is received from the external apparatus 20, the controller 160 may perform authentication of the external apparatus 20 via prestored information or a user's selection, and may decide which Bluetooth communicator will receive sound data from the authenticated external apparatus. Such decision may be performed by a user's selection, and may be set to preferentially connect the second Bluetooth communicator 112-2.

When a Bluetooth communicator is selected to perform the communication, the controller 160 may control the selected Bluetooth communicator so that the selected Bluetooth communicator receives sound data. Hereinafter, it is assumed that the second Bluetooth communicator 112-2 is selected for convenience in explanation.

When the second Bluetooth communicator 112-2 is selected and receives sound data from an external apparatus, for example external apparatus 20, the controller 160 may control the second Bluetooth communicator 112-2, the PCH 141, and the audio codec 143 so that the received sound data is decoded in the audio codec 143. In addition, the controller 160 may control the audio codec 143 and the speaker 150 so that the decoded sound data is outputted through the speaker 150. Further, depending upon which Bluetooth communicator is selected to receive sound data from the external apparatus 20, the non-selected Bluetooth communicator may selectively transmit sound source data stored in storage 130 to the external apparatus 20 and/or a different external apparatus (not depicted) upon a user instruction or automatically, depending on user pre-stored settings.

Hereinafter, an operation of the electronic apparatus 100", when the electronic apparatus 100" includes a plurality of Bluetooth modules and the operation mode of the electronic apparatus 100" is the non-booting mode, will be described.

When the operation mode of the electronic apparatus 100" is the non-booting mode, the power supply does not supply power to the PCH 141, the first Bluetooth communicator 112-1, the audio codec 143, and the controller 160, etc., and supplies power to the second Bluetooth communicator 112-2 and the audio amplifier 145.

In this state, the second Bluetooth communicator 112-2 may operate only in a mode of receiving sound data from an external apparatus, for example external apparatus 20.

Accordingly, the second Bluetooth communicator 112-2 is paired with the external apparatus 20 by a request of the external apparatus 20, and receives sound data from the paired external apparatus 20. At this time, the second Bluetooth communicator 112-2 decodes the received sound data and outputs analog sound data to the audio amplifier 145. The audio amplifier 145 receives the analog sound data and amplifies and outputs the received analog sound data through the speaker 150.

Figure 5:
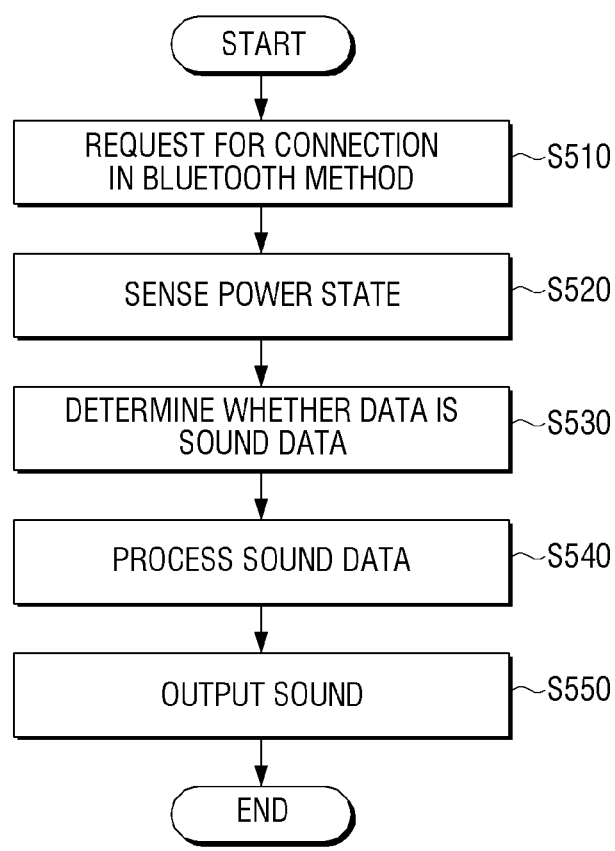
FIG. 5 is a flow chart illustrating a method of outputting sound according to an exemplary embodiment of the present general inventive concept.

Meanwhile, in explaining FIG. 4 and FIG. 5, it has been shown and described that the PCH 141 is a component of the sound processor 140, but the present general inventive concept is not limited thereto. For example, the PCH may be realized as a component of the controller 160 in the implementation. In addition, the Bluetooth communicator and the sound processor 140 have been shown as separate components, but the present general inventive concept is not limited thereto. For example, the Bluetooth communicator and the sound processor 140 may be realized as a single component.

FIG. 5 is a flow chart illustrating a method of outputting sound according to an exemplary embodiment of the present general inventive concept.

Referring to FIG. 5, the electronic apparatus 100 receives a request for connection in the Bluetooth method (S510) from an external apparatus, for example external apparatus 20.

When the request for connection is received in the Bluetooth method, the electronic apparatus 100 senses the current operation mode (S520) of the electronic apparatus 100, and then determines whether the requested connection is for outputting sound data (S530).

If it is determined that the current operation mode is the non-booting mode and the requested connection is not for outputting sound data, the electronic apparatus 100 may reject the request of the external apparatus 20.

By contrast, if it is determined that the current operation mode is the non-booting mode, and the requested connection is for outputting sound data, the electronic apparatus 100 may accept the request of the external apparatus 20. Meanwhile, if it is determined that the current operation mode is a booting mode and the requested connection is not for outputting sound data, the electronic apparatus 100 may perform an operation by control of the operating system or a user's selection.

If it is determined that the requested connection is for outputting sound data, the electronic apparatus 100 processes the received sound data (S540). To be specific, if it is determined that the current operation mode of the electronic apparatus 100 is the non-booting mode, the electronic apparatus 100 processes the sound data using the receive-only Bluetooth communication module (i.e., the Bluetooth communicator 112), and if it is determined that the current operation mode is the booting mode, the electronic apparatus 100 processes the received sound data by the control of the operating system.

Meanwhile, when the sound data is processed, the electronic apparatus 100 outputs the processed sound data through the speaker 150 (S550).

The method of outputting sound, according to the above exemplary embodiment of the present general inventive concept, may include outputting the received sound data through the speaker 150 using the Bluetooth communicator 112 and the sound processor 140 which autonomously operate even when the electronic apparatus 100 is not booted. The sound outputting method in FIG. 5 may be executed on an electronic apparatus having the configuration in FIG. 2, and may be executed in an electronic apparatus having a different configuration.

In addition, the controlling method as specified above may be realized as a program (or an application) including an algorithm executable in a computer, and the program may be provided by being stored in a non-transitory computer readable medium.

A non-transitory computer readable medium refers to a medium which stores data semi-permanently rather than storing data for a very short time such as a register, a cache, and a memory, and is readable by a device. To be specific, the above-described various applications or programs may be provided by being stored in a non-transitory computer readable medium such as a compact disc (CD), a digital versatile disk (DVD), a hard disk, a Blu-ray disk, a universal serial bus (USB), a memory card, and a read-only memory (ROM), or the like.

Figure 6:
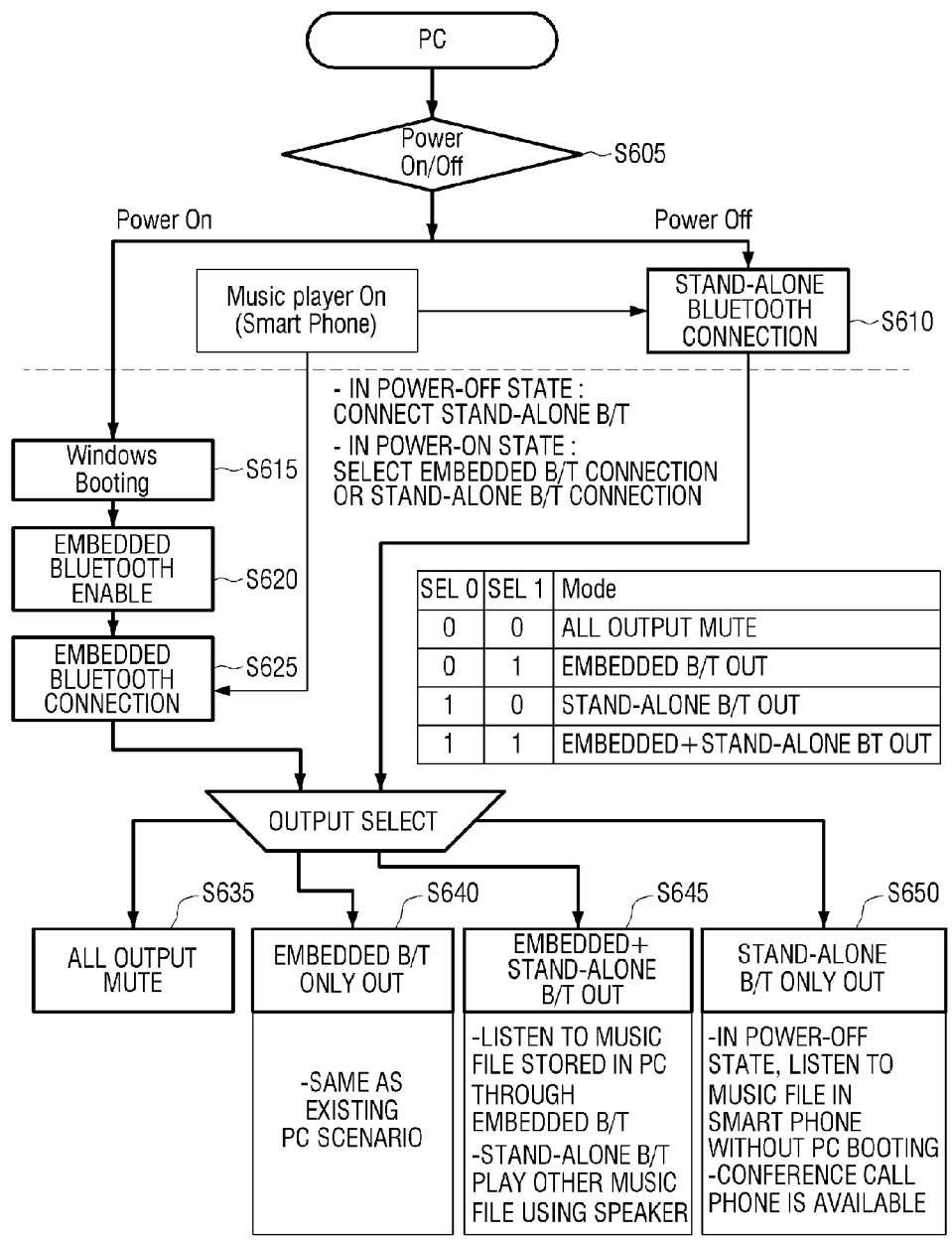
FIG. 6 is a flow chart illustrating a method of outputting sound when a plurality of Bluetooth modules are equipped.

FIG. 6 is a flow chart illustrating a method of outputting sound when the electronic apparatus 100 includes a plurality of Bluetooth modules according to the present general inventive concept.

The operation mode of the electronic apparatus 100 is determined (S605).

If it is determined that the current operation mode of the electronic apparatus 100 is the non-booting mode, the electronic apparatus 100 performs connection with an external apparatus, for example external apparatus 20, using the receive-only Bluetooth module (i.e., the second Bluetooth communicator 112-2) (S610). In addition, the receive-only Bluetooth module performs a sound process of the received sound data and outputs the sound data through the speaker 150.

If it is determined that the current operation mode of the electronic apparatus 100 is the normal mode, i.e., where the operating system is booted (S615), an embedded Bluetooth module (i.e., the first Bluetooth communicator 112-1) is turned on (S620), and thus the electronic apparatus 100 performs connection with the external apparatus 20 using the embedded Bluetooth module (S625).

Meanwhile, if it is determined that the current operation mode of the electronic apparatus 100 is the normal mode, the electronic apparatus 100 may control four types of connection states. A first mode (S635) refers to a mode where a speaker does not output any sound, a second mode (S640) refers to a mode where the sound data received through the embedded Bluetooth module (that is, the first Bluetooth communicator 112-1) is outputted through the speaker 150, a third mode (S650) refers to a mode where the sound data received through the receive-only Bluetooth module (that is, the second Bluetooth communicator 112-2) is outputted through the speaker 150, and a fourth mode (S645) refers to a mode where the sound data received through the receive-only Bluetooth module is outputted through the speaker 150, and sound source data stored in the electronic apparatus 100 is transmitted to at least one other external apparatus (not depicted) through the embedded Bluetooth communicator.

The controlling method according to the above exemplary embodiment of the present general inventive concept displays a virtual bezel area when a user's grip is sensed, and does not input a user's touch to the virtual bezel area, and thus may prevent an operation of a touch screen from being executed when the user erroneously inputs a user command in response to gripping/holding the electronic apparatus. That is, the controlling method may display the virtual bezel area in response to sensing a user's grip so that any user command erroneously input over the virtual bezel area by the user while gripping/holding the electronic apparatus will not be executed by the electronic apparatus. The controlling method in FIG. 6 may be executed on an electronic apparatus having the configuration in FIG. 2, and may be executed on an electronic apparatus having a different configuration so long as the electronic apparatus is Bluetooth enabled.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus, comprising:
   a storage to store an operating system;
   a controller to boot the electronic apparatus using the operating system stored in the storage;
   a speaker to output sound;
   a communication interface to receive sound data from an external apparatus; and
   a sound processor to process and output the received sound data through the speaker,
   wherein the communication interface, the sound processor, and the speaker operate even when the electronic apparatus is not booted,
   wherein the communication interface comprises a Bluetooth communicator to receive sound data using a Bluetooth method, and
   wherein, when the electronic apparatus is booted, the Bluetooth communicator transmits the received sound data to the sound processor using a digital method, and when the electronic apparatus is not booted, transmits the received sound data to the sound processor using an analog method.

2. The apparatus as claimed in claim 1, wherein, when the electronic apparatus is booted, the Bluetooth communicator transmits the received sound data to the sound processor using a digital method by control of the controller, and, when the electronic apparatus is not booted, transmits the received sound data to the sound processor using an analog method without control of the controller.

3. The apparatus as claimed in claim 1, wherein the sound processor comprises:
   an audio amplifier to amplify sound data transmitted using an analog method and output the sound data through the speaker.

4. The apparatus as claimed in claim 3, wherein the audio amplifier operates only when the electronic apparatus is not booted.

5. The apparatus as claimed in claim 3, wherein the sound processor further comprises:
   an audio codec to decode the sound data transmitted using the digital method and output the sound data through the speaker; and
   a Platform Controller Hub (PCH) configured to transmit the sound data outputted from the Bluetooth communicator to the audio codec.

6. The apparatus as claimed in claim 5, wherein the audio codec operates by control of the controller when the electronic apparatus is booted.

7. The apparatus as claimed in claim 1, wherein, when the electronic apparatus is booted while the received sound data is transmitted to the sound processor using an analog method, the Bluetooth communicator transmits the received sound data to the sound processor using a digital method.

8. The apparatus as claimed in claim 3, wherein the electronic apparatus further comprises:
   a power supply configured to supply power to each component of the electronic apparatus; and
   wherein, even when a booting instruction to the electronic apparatus is not inputted, the power supply supplies power to the Bluetooth communicator and the audio amplifier, and supplies no power to the controller and the storage.

9. An electronic apparatus, comprising:
   a storage to store an operating system;
   a controller to boot the electronic apparatus using the operating system stored in the storage;
   a speaker to output sound;
   a communication interface to receive sound data from an external apparatus; and
   a sound processor to process and output the received sound data through the speaker,
   wherein the communication interface, the sound processor, and the speaker operate even when the electronic apparatus is not booted, and
   wherein the communication interface comprises:
   a first Bluetooth communicator to operate only when the electronic apparatus is booted, and to exchange data with the external apparatus using a Bluetooth method; and
   a second Bluetooth communicator to receive sound data from the external apparatus using a Bluetooth method and transmit the received sound data to the sound processor using an analog method.

10. The apparatus as claimed in claim 9, wherein, when sound data is received using a Bluetooth method, the first Bluetooth communicator transmits the received sound data to the sound processor using a digital method.

11. The apparatus as claimed in claim 9, wherein the first Bluetooth communicator operates by control of the controller, and the second Bluetooth communicator operates with or without control of the controller.

12. The apparatus as claimed in claim 9, wherein the sound processor comprises:
   an audio amplifier to amplify the sound data transmitted through the second Bluetooth communicator and output the sound data through the speaker;
   an audio codec to operate when the electronic apparatus is booted, to decode the sound data transmitted using the digital method, and to output the sound data through the speaker; and
   a PCH to transmit the sound data outputted from the first Bluetooth communicator to the audio codec.

13. The apparatus as claimed in claim 9, wherein the audio processor further comprises:
   a switch to selectively transmit the sound data outputted from the audio amplifier or the audio codec to the speaker.

14. The apparatus as claimed in claim 9, wherein the storage stores sound source data, and
   wherein, when the second Bluetooth communicator receives sound data from a first external apparatus, the controller controls the second Bluetooth communicator to transmit the sound source data to a second external apparatus.

15. The apparatus as claimed in claim 12, further comprising:
- a power supply to supply power to each component of the electronic apparatus,
- wherein, when a booting instruction to the electronic apparatus is not inputted, the power supply supplies power to the second Bluetooth communicator and the audio amplifier, and supplies no power to the controller, the storage, the first Bluetooth communicator, the audio codec, and the PCH.

16. The apparatus as claimed in claim 1, wherein the electronic apparatus is an all-in-one PC or a notebook computer.

17. An electronic apparatus comprising:
- a speaker to output sound data as sound; and
- a communication interface to be in a state to, when the electronic apparatus is in a power-off state, receive sound data from an external apparatus and transmit the received sound data to a sound processor which processes the sound data such that the speaker outputs the processed sound data as sound when the electronic apparatus is in the power-off state,
- wherein the communication interface comprises:
- a Bluetooth communicator to receive sound data using a Bluetooth method; and
- wherein, when the electronic apparatus is booted, the Bluetooth communicator transmits the received sound data to the sound processor using a digital method, and when the electronic apparatus is not booted, transmits the received sound data to the sound processor using an analog method.

18. A method of controlling an electronic apparatus, the method comprising:
- receiving sound data from an external apparatus using a Bluetooth method;
- transmitting the received sound data to a sound processor;
- processing the received sound data; and
- outputting the processed sound data as sound from a speaker of the electronic apparatus such that the receiving and outputting are performed when the electronic apparatus is in a power-off state,
- wherein, when the electronic apparatus is booted, the received sound data is transmitted to the sound processor using a digital method, and when the electronic apparatus is not booted, the received sound data is transmitted to the sound processor using an analog method.

19. A non-transitory computer-readable medium to contain computer-readable codes as a program to perform the method of claim 18.

* * * * *